US010983657B1

(12) United States Patent
Hanrahan et al.

(10) Patent No.: US 10,983,657 B1
(45) Date of Patent: Apr. 20, 2021

(54) SYSTEMS AND METHODS FOR PROVIDING A CLIENT-SIDE CONFIGURABLE GRAPHICAL CONTROL ELEMENT FRAMEWORK

(71) Applicant: JPMorgan Chase Bank, N.A., New York, NY (US)

(72) Inventors: Kevin T. Hanrahan, Evanston, IL (US); David John Walsh, Winnetka, IL (US); Babhith Arayullathil, Bangalore (IN); Tim Foden, London (GB); Daniel Rees, London (GB); Rupert Edoardo Cobbe-Warburton, London (GB); Lance Calamita, Chicago, IL (US)

(73) Assignee: JPMorgan Chase Bank, N. A., New York, NY (US)

(*) Notice: Subject to any disclaimer, the term of this patent is extended or adjusted under 35 U.S.C. 154(b) by 196 days.

(21) Appl. No.: 15/245,680

(22) Filed: Aug. 24, 2016

(51) Int. Cl.
| | |
|---|---|
| *G06F 3/048* | (2013.01) |
| *G06F 3/0481* | (2013.01) |
| *G06T 11/20* | (2006.01) |
| *G06F 3/0484* | (2013.01) |
| *G06F 16/248* | (2019.01) |
| *G06F 16/25* | (2019.01) |
| *G06F 16/2455* | (2019.01) |

(52) U.S. Cl.
CPC .......... *G06F 3/0481* (2013.01); *G06F 3/0484* (2013.01); *G06F 16/248* (2019.01); *G06F 16/2455* (2019.01); *G06F 16/252* (2019.01); *G06T 11/206* (2013.01)

(58) Field of Classification Search
CPC .... G06F 3/048; G06F 16/2455; G06F 16/248; G06F 16/252; G06F 3/0484; H04L 67/02; G06T 11/206
See application file for complete search history.

(56) References Cited

U.S. PATENT DOCUMENTS

| | | | |
|---|---|---|---|
| 2004/0083453 A1* | 4/2004 | Knight | G06F 11/323 717/113 |
| 2006/0136819 A1* | 6/2006 | Tolle | G06F 17/211 715/235 |
| 2012/0110544 A1* | 5/2012 | Novak | G06F 8/20 717/101 |

(Continued)

*Primary Examiner* — Xuyang Xia
(74) *Attorney, Agent, or Firm* — Hunton Andrews Kurth LLP (57) ABSTRACT

Systems and methods for providing a client-side configurable graphical control element framework are disclosed. In one embodiment, a system may include a client device that may execute a user interface and a data services component in communication with the client device and a data source. The user interface may retrieve a graphical control element configuration file and may transmit a request for data, including a metric identifier, to the data services component. The data services component may retrieve a data services configuration file for the metric identifier, and may request data from the data source based on the data services configuration file. The data services component receives data from the data source and formats the data according to the data services configuration file. The user interface may receive the formatted data and represent the data as a graphical control element according to the graphical control element configuration file.

12 Claims, 6 Drawing Sheets

(56) References Cited

U.S. PATENT DOCUMENTS

| | | | |
|---|---|---|---|
| 2014/0282053 A1* | 9/2014 | Hauschild | G06F 3/0481 |
| | | | 715/744 |
| 2016/0041997 A1* | 2/2016 | Gokhale | G06F 3/0482 |
| | | | 707/694 |
| 2017/0351753 A1* | 12/2017 | Duncker | G06F 16/338 |

* cited by examiner

Figure 1

```
{
    "id":"PaymentsByCurrency",
    "chartTitle":"Payments By Currency",
    "chartType":"Pie Chart",
    "isTrendChart":"false",
    "tablePrimaryColumnLabel":"Currency",
    "dsQueryType":"payments-by-currency",
    "dsColumnAlias":"creditAmountCurrency",
    "sortFunction":"none",
    "columnValueForDrillDownToChart":"",
    "paymentsSearchCriteriaForDrillDown":"Currency",
    "additionalPaymentsSearchCriteriaForDrillDown":{}
},
```

Figure 2

```xml
<queryType name="payments-by-currency">
    <queryName>getPaymentsByCurrency</queryName>
    <queryDescription>Payments By Currency View</queryDescription>
    <queryTemplate> SELECT CR_CRCY AS currency, COUNT(CR_CRCY) AS count FROM
VW_PYMT_TXN_SUMMARY ${MATCH_FILTER} ${RANGE} GROUP BY CR_CRCY HAVING CR_CRCY is NOT NULL
ORDER BY count DESC </queryTemplate>
    <columnMetaData>
        <column>
            <name>CR_CRCY</name>
            <alias>currency</alias>
            <type>string</type>
        </column>
        <column>
            <name>pymt_amt</name>
            <alias>amount</alias>
            <type>string</type>
        </column>
        <column>
            <name>msg_src_sys</name>
            <alias>messageSourceSystem</alias>
            <type>string</type>
        </column>
        <column>
            <name>proc_brch_id</name>
            <alias>branchId</alias>
            <type>string</type>
        </column>
        <column>
            <name>RQST_EXE_DT</name>
            <alias>requestValueDate</alias>
            <type>date</type>
        </column>
        <column>
            <name>pymt_cre_ts_utc</name>
            <alias>creationTimestamp</alias>
            <type>timestamp</type>
        </column>
    </columnMetaData>
    <dataSource>payment_ods</dataSource>
    <queryRunner>paymentsDAO</queryRunner>
    <templateBuilder>oracleReadQueryTemplateBuilder</templateBuilder>
</queryType>
```

```
[
    {
        "resourceType":"payments",
        "metric":"payments-by-currency",
        "range":{
           "creationTimestamp":[
              "2015-07-06 00:00",
              "2015-07-20 23:59"
           ]
        }
    }
]
```

Figure 5a

```
{
    "attributes":{
       "data":[
          {
             "CURRENCY":"USD",
             "COUNT":"22484"
          },
          {
             "CURRENCY":"INR",
             "COUNT":"116"
          },
          {
             "CURRENCY":"MXN",
             "COUNT":"108"
          },
          {
             "CURRENCY":"NOK",
             "COUNT":"10"
          },
          {
             "CURRENCY":"EUR",
             "COUNT":"10"
          },
          {
             "CURRENCY":"ZAR",
             "COUNT":"3"
          }
       ],
       "pagination":{

SYSTEMS AND METHODS FOR PROVIDING A CLIENT-SIDE CONFIGURABLE GRAPHICAL CONTROL ELEMENT FRAMEWORK

BACKGROUND OF THE INVENTION

1. Field of the Invention

The present invention generally relates to systems and methods for providing a client-side configurable graphical control element framework.

2. Description of the Related Art

Graphical control elements, commonly known as widgets, are often used to interact with a user. Each widget generally facilitates a specific type of user-computer interaction, and forms a part of the overall user interface.

SUMMARY OF THE INVENTION

Systems and methods for providing a client-side configurable graphical control element framework are disclosed. In one embodiment, a method for displaying data in a configurable graphical control element may include (1) receiving, at a user interface executed by a client device comprising at least one computer processor, a graphical control element configuration file; (2) the user interface transmitting, to a data services component, a request for data comprising a metric identifier; (3) the user interface receiving, from the data services component, data responsive to the request for data; and (4) the user interface representing the data as a graphical control element according to the graphical control element configuration file.

In one embodiment, the graphical control element configuration file may include a title and at least one chart label.

In one embodiment, the graphical control element configuration file may specify at least one chart type for presenting the data.

In one embodiment, the request for data may further include at least one of a resource identifier and a range parameter.

In one embodiment, the metric identifier may identify a data services configuration file that identifies specific data to be retrieved.

In one embodiment, the metric identifier may further identify a format for the data.

In one embodiment, the user interface may be a browser executed by the client device.

According to another embodiment, a method for displaying data in a configurable graphical control element may include (1) a data services component executed by at least one computer processor receiving, from a client device, a request for data comprising a metric identifier; (2) the data services component retrieving a data services configuration file associated with the metric identifier and requests data from at least one data source based on the data services configuration file; (3) the data services component receiving data from the at least one data source and formats the data according to the data services configuration file; and (4) the data services component sending the formatted data to the user interface.

In one embodiment, the request for data may further include at least one of a resource identifier and a range parameter.

In one embodiment, the metric identifier may further identify a format for the data.

According to one embodiment, a system for displaying data in a configurable graphical control element may include a client device that may include at least one computer processor and executing a user interface and a data services component in communication with the client device and at least one data source. The user interface may retrieve a graphical control element configuration file and may transmit a request for data, including a metric identifier, to the data services component. The data services component may retrieve a data services configuration file associated with the metric identifier, and may request data from the at least one data source based on the data services configuration file. The data services component receives data from the at least one data source and formats the data according to the data services configuration file. The user interface may receive the formatted data and represent the data as a graphical control element according to the graphical control element configuration file.

In one embodiment, the user interface may be a browser.

In one embodiment, the graphical control element configuration file may include a title and at least one chart label.

In one embodiment, the graphical control element configuration file may specify at least one chart type for presenting the data.

In one embodiment, the request for data may further include at least one of a resource identifier and a range parameter.

In one embodiment, the metric identifier may identify a data services configuration file that identifies specific data to be retrieved.

In one embodiment, the data services component may include a controller layer that may interface with the user interface, a data access layer that may interface with the at least one data source, and a view builder layer that may route the request from the controller layer to the data access layer.

In one embodiment, the view builder layer may format the data received from the data access layer according to the data services configuration file and may provide the formatted data to the controller layer.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Several embodiments of the present invention and their advantages may be understood by referring to FIGS. 1-6.

Embodiments are directed to systems and methods for providing a client-side configurable graphical control element framework.

Embodiments disclosed herein may provide a standard and configurable client side widget framework.

Embodiments disclosed herein may contain a set of reusable, generic widgets that may behave differently depending on the data and metadata returned from the data service.

Embodiments may support N number of instances of each widget, instead of having to create brand new widgets for each use case.

Embodiments may support each individual widget representing data sets in multiple ways depending on its configuration.

Embodiments are directed to an interface that may contain a set of reusable, generic widgets that may act differently depending on the data and metadata returned from a data service. The interface may support a plurality of instances of each widget, so that new widgets are not required. In one embodiment, each widget may represent data sets in multiple ways depending on how it is configured Referring to FIG. 1, system 100 may include data services component 110, client device 130, user interface 140, and data tier 150. In one embodiment, data services server 110 may provide controller layer 115, view builder layer 120, and data access layer 125.

Figure 1:
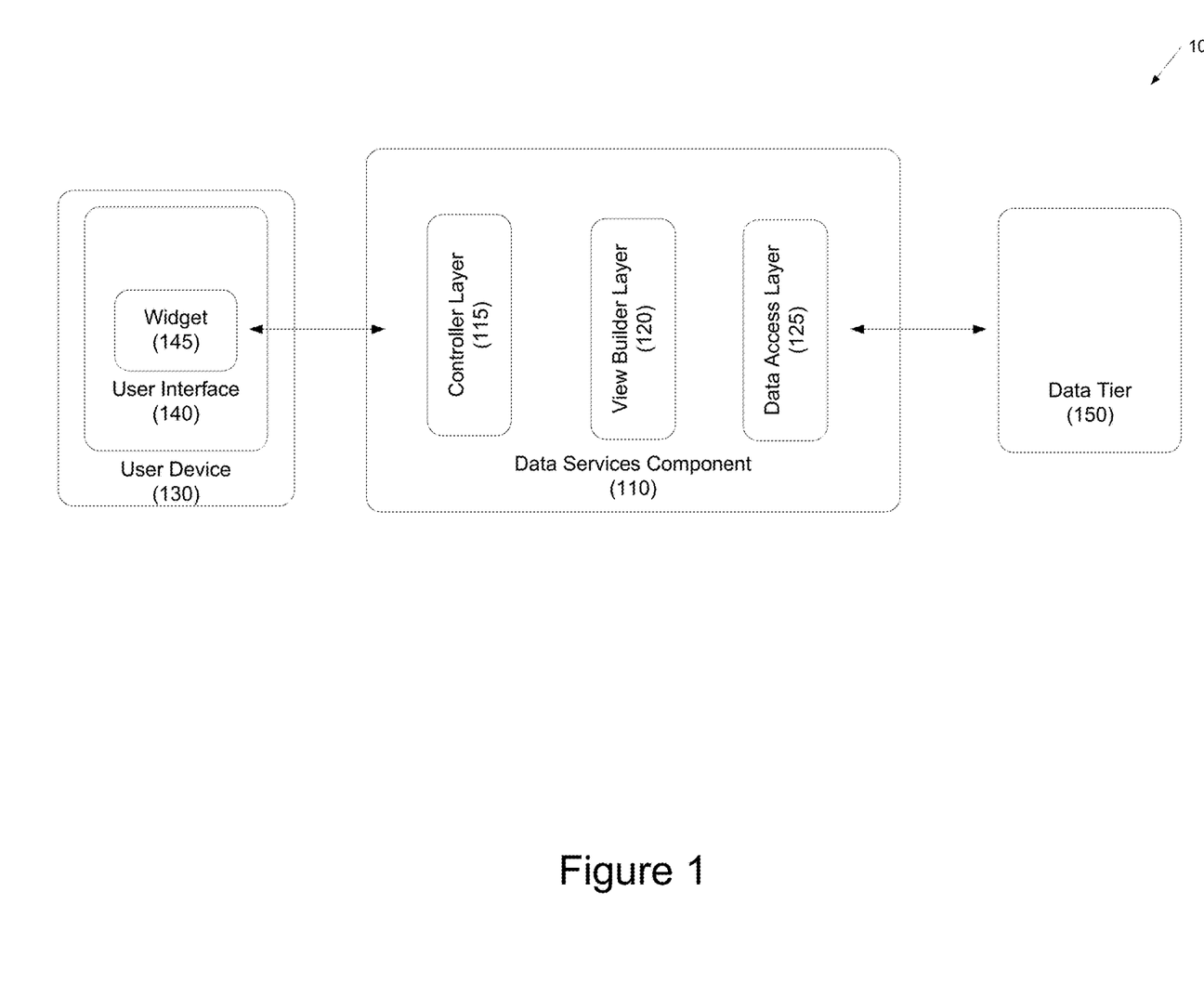
FIG. 1 depicts a system for providing a client-side configurable graphical control element framework according to one embodiment.

In one embodiment, data services component may be hosted by one or more servers or suitable electronic devices.

In one embodiment, client device 130 may host or execute user interface 140, which may display widget 145. In one embodiment, user interface 140 may be a browser.

In one embodiment, client device 130 may be any suitable electronic device, including a workstation, desktop computer, notebook computer, tablet computer, etc.

Figure 2:
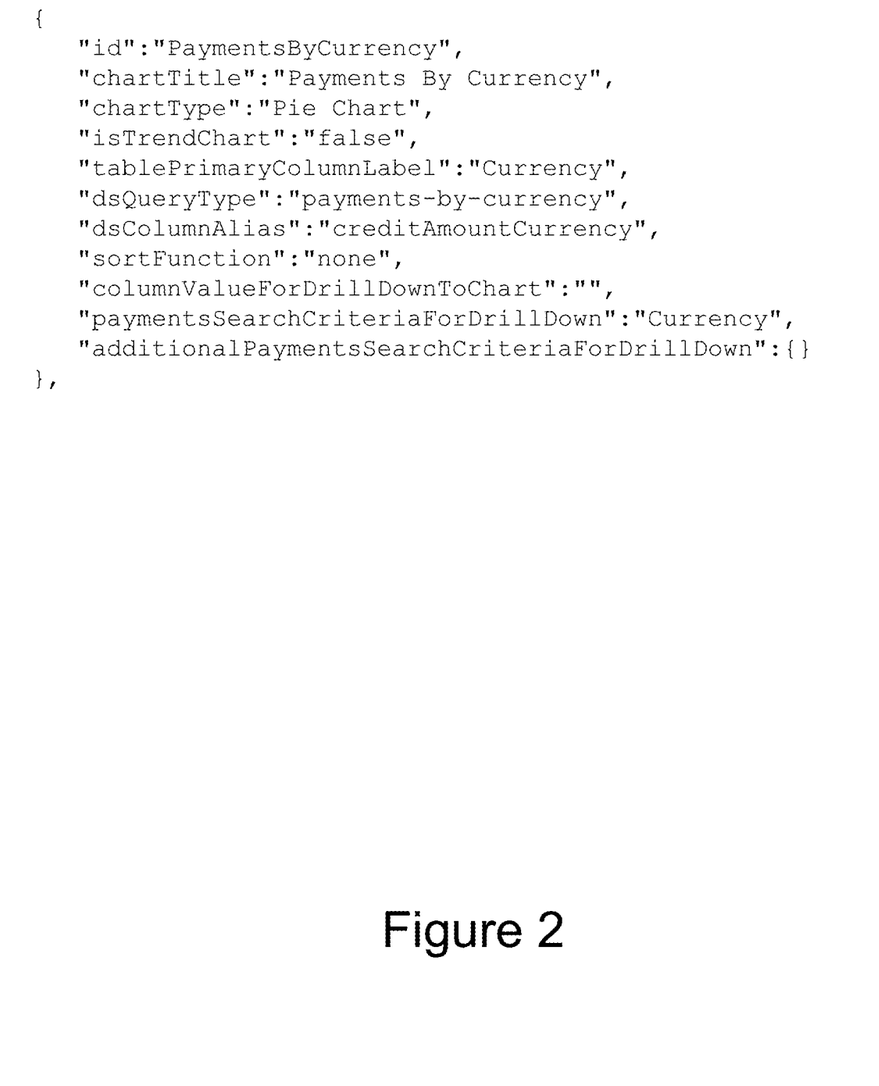
FIG. 2 depicts an exemplary client-side graphical control element configuration file according to one embodiment.

In one embodiment client device 130 and/or user interface 140 may include a client-side widget configuration file (not shown) that may define specifics for a widget. Exemplary FIG. 2 depicts a client-side widget configuration for a widget entitled "payments-by-currency-widget-config."

System 100 may further include one or more data tier 150, which may store data that may be presented by widget 145. Any suitable data source that may provide data that may be displayed by widget 145 may be used as necessary and/or desired.

In one embodiment, user interface 140 may interface with controller layer 115 to request/receive data to be presented by widget 145. Controller layer 115 may route the request to data access layer 125.

Data access layer 125 may interface with one or more data tier 150 to request and receive data.

View builder layer 120 may receive the data from data access layer 125. It may retrieve a metadata file, such as a configuration file, that may define the data and the format in which that data may be returned to user interface 140. For example, the file may identify columns of data to be returned.

Figure 3:
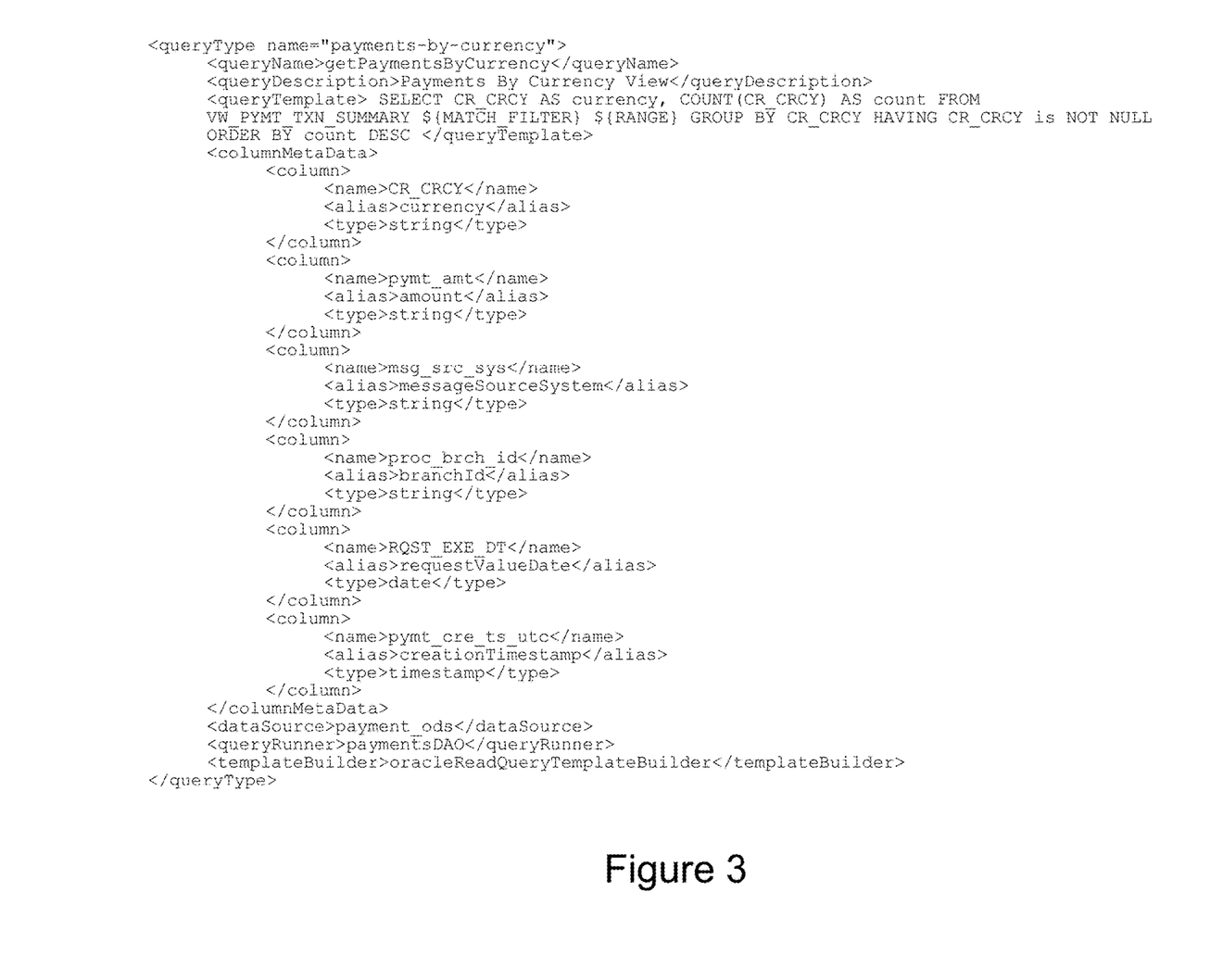
FIG. 3 depicts an exemplary data services configuration file according to one embodiment.

An example configuration file is provided as FIG. 3.

Although three different layers are illustrated in data services component 110, it should be noted that a greater number of layers, or a fewer number of layers, may be provided as is necessary and/or desired.

Figure 4:
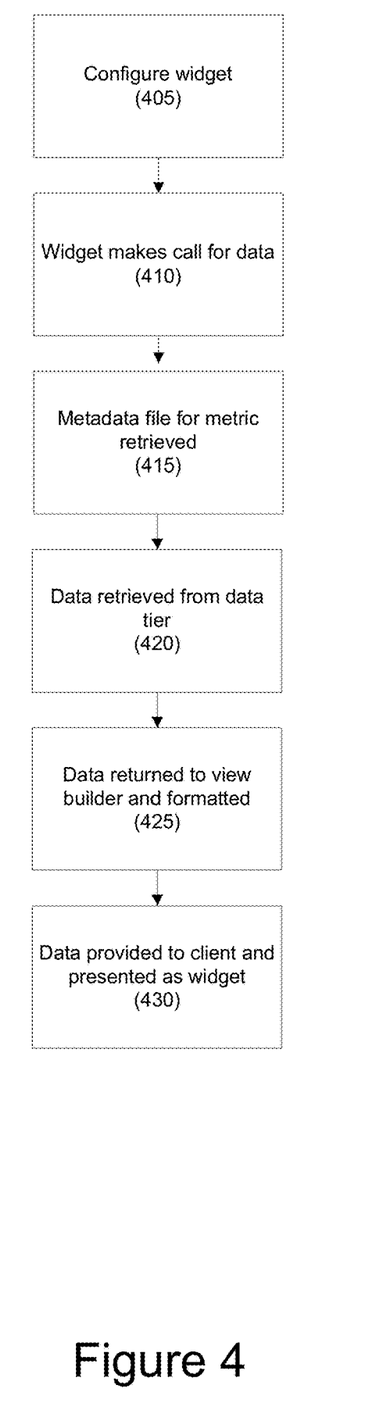
FIG. 4 depicts a method for providing a client-side configurable graphical control element framework according to one embodiment.

Referring to FIG. 4, a method for providing a client-side configurable widget framework is disclosed according to one embodiment. In step 405, the manner in which the data may be presented by the widget may be defined. For example, a widget configuration file may identify the data that will be presented, one or more graphical representations for the data (e.g., chart, graph, etc.), etc. In one embodiment, as part of the configuration, the view for the widget may be customized. In one embodiment, the user may use a view query configurator, which may declare named query templates for creating the view types, such as summary, metric, chart, and combinations thereof.

In other embodiments, the widget configuration file may further include alias names for each of the database columns so that the real database columns are not displayed; the data source (i.e., the actual database) that is queried; the name of the data access component to use to perform the query (e.g., so that multiple data sources, across multiple database platforms, may be supported In one embodiment, the widget configuration file may be retrieved from a library of widget configuration files or may be created for a specific widget. In another embodiment, widget meta data may be retrieved from a separate source, and the widget configuration may be changed without having to redeploy configurations.

In step 410, a call for data to be presented in the widget may be made from the client, such as a user interface (e.g., a browser) hosted on a client device to a data services component. For example, the call may be made to an API Controller Layer.

Figure 5A:
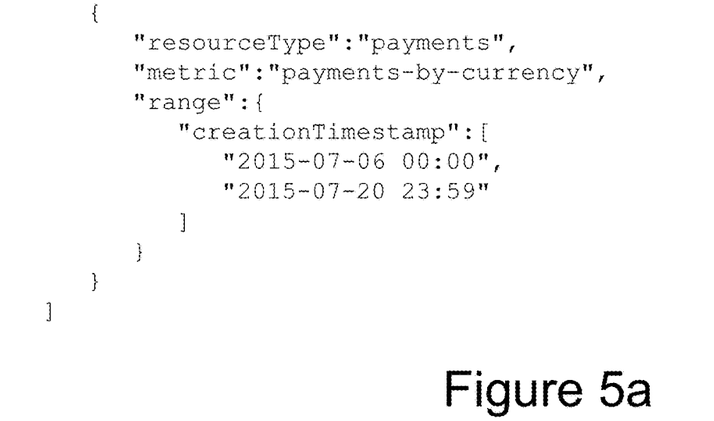
FIGS. 5a and 5b depict exemplary client request and response views according to one embodiment.

An example client view of a data call is provided in FIG. 5a. In one embodiment, the request may specify a metric, a range, and a resource type. For example, a metric may be used to look up relevant metadata file in, for example, the view builder component. In FIG. 5a, the metric is identified as "payments-by-currency"; another example that could be used is "completed-payments." Any suitable metric that may be used to identify metadata may be used as necessary and/or desired.

In one embodiment, the value of the metric may change the response view.

In one embodiment, the range may identify a data query range, such as a time period for the requested data. In FIG. 5a, the range is between the creationTimestamps of "2015-07-06 00:00" "and "2015-07-20 23:59."

In one embodiment, the resource type may specify a database to query. For example, the resource type may identify "payments," which would identify the payments database(s). As another example, the resource type may be "exceptions," which would result in exception databases being searched.

In step 415, the configuration file for the metric may be retrieved. In one embodiment, the view builder component, or a similar component, may retrieve the metadata file associated with the metric. In one embodiment, the configuration file may comprise metadata.

An example metadata file for the metric "received-payments" is provided as FIG. 4. In this example, the columns of data that are to be displayed are identified.

Ins step 420, the data may be retrieved from the data tier. The data that is retrieved may be based on the data types identified in the metadata file, as well as the parameters identified in the request (e.g., range and/or resource type).

In one embodiment, the data access layer may access one or more data tiers for the data.

In step 425, the data from the data tier may be returned to, for example, the view builder. The view builder may format the data according to the metadata file.

In step 430, the data may be returned to the user interface, which may then present the data according to the widget configuration file.

Figure 5B:
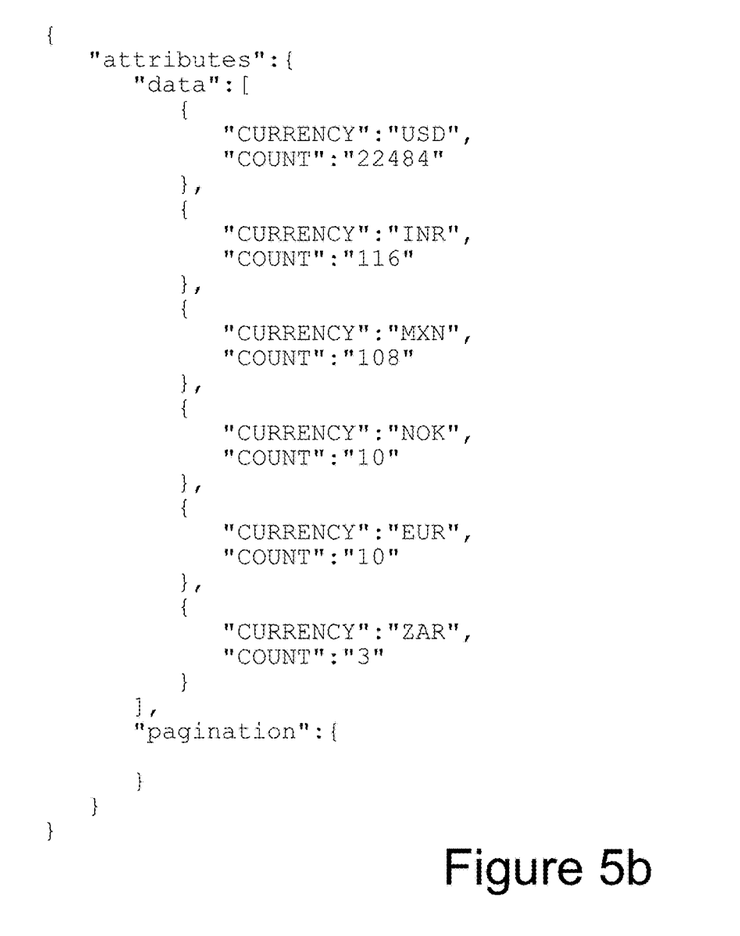

An example client view of a response, based on the request in FIG. 5a, is provided in FIG. 5b.

Figure 6A:
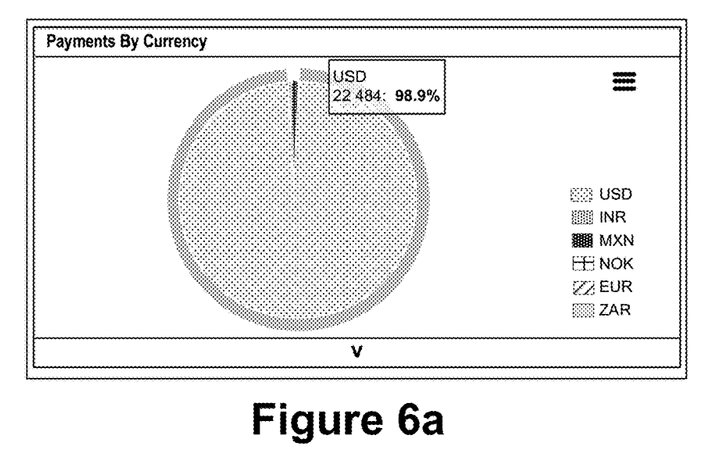
FIGS. 6a. 6b, and 6c depict exemplary widgets according to embodiments.
Figure 6B:
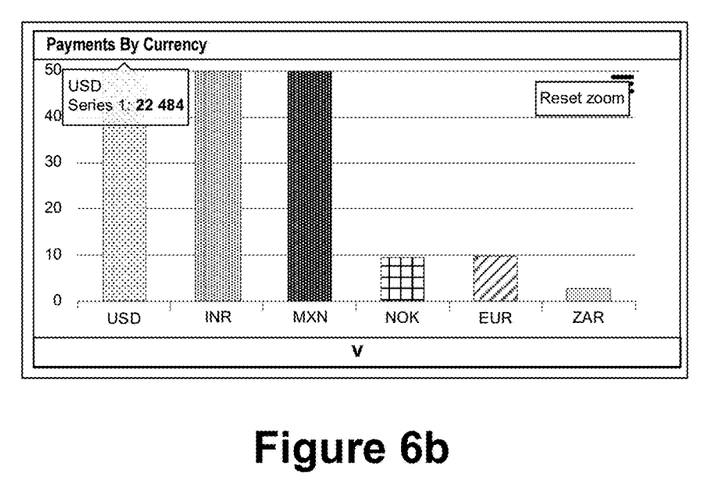
Figure 6C:
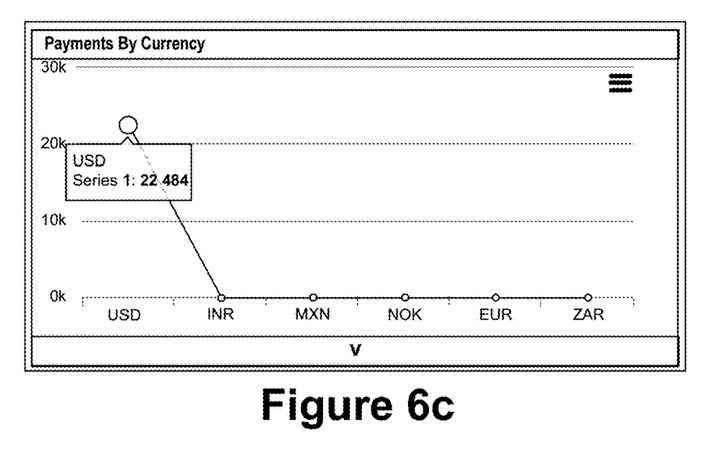

Example widgets are illustrated as FIGS. 6a-c.

It should be recognized that although several embodiments have been disclosed, these embodiments are not exclusive and aspects of one embodiment may be applicable to other embodiments.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for displaying data in a configurable graphical control element, comprising:
   receiving, at a user interface executed by a client device comprising at least one computer processor, a graphical control element configuration file specifying one or more chart types for presenting data, alias names for at least one real database column to be retrieved, a data source to be queried, and a data access services component to perform the query;
   the user interface transmitting, to the data services component, a request for data comprising a metric identifier, wherein the metric identifier identifies a data services configuration file that identifies specific data to be retrieved; wherein the specific data to be retrieved includes the at least one real database column; wherein the graphical control element configuration file is executed on a client side to retrieve the specific data stored on a server side;
   the user interface receiving, from the data services component, data responsive to the request for data;
   the user interface representing the received data as a graphical control element according to the graphical control element configuration file; wherein the user interface represents the received data so that the real database columns are not displayed;
   modifying the graphical control element configuration file to specify a new chart type;
   automatically updating the graphical control element based on the modified graphical control element configuration file without the user interface transmitting a new request for data.

2. The method of claim 1, wherein the graphical control element configuration file comprises a title and at least one chart label.

3. The method of claim 1, wherein the request for data further comprises at least one of a resource identifier and a range parameter.

4. The method of claim 1, wherein the metric identifier further identifies a format for the data.

5. The method of claim 1, wherein the user interface comprises a browser executed by the client device.

6. The method of claim 1, wherein the user interface receives, from the data services component, data from multiple data sources, and wherein the user interface represents the received data from multiple data sources, according to the graphical control element configuration file, so that the data from multiple data sources is displayed in one column with at least one of the alias names as a title of the one column.

7. A system for displaying data in a configurable graphical control element, comprising:
 a client device comprising at least one computer processor and executing a user interface; and
 a data services component in communication with the client device and at least one data source;
 wherein:
  the user interface retrieves a graphical control element configuration file specifying one or more chart types for presenting data, alias names for at least one real database column to be retrieved, a data source to be queried, and the data access services component to perform the query;
  the user interface transmits a request for data comprising a metric identifier to the data services component, wherein the metric identifier identifies a data services configuration file that identifies specific data to be retrieved; wherein the specific data to be retrieved includes the at least one real database column; wherein the graphical control element configuration file is executed on a client side to retrieve the specific data stored on a server side;
  the data services component retrieves a data services configuration file associated with the metric identifier and requests data from the at least one data source based on the data services configuration file;
  the data services component receives data from the at least one data source and formats the data according to the data services configuration file; and
  the user interface receives the formatted data and represents the data as a graphical control element according to the graphical control element configuration file;
  wherein the user interface represents the received data so that the real database columns are not displayed;
  the user interface receives a modification to the graphical control element configuration file to specify a new chart type;
  the user interface automatically updates the graphical control element based on the modified graphical control element configuration file without the user interface transmitting a new request for data.

8. The system of claim 7, wherein the user interface comprises a browser.

9. The system of claim 7, wherein the graphical control element configuration file comprises a title and at least one chart label.

10. The system of claim 7, wherein the request for data further comprises at least one of a resource identifier and a range parameter.

11. The system of claim 7, wherein the data services component comprises a controller layer that interfaces with the user interface, a data access layer that interfaces with the at least one data source, and a view builder layer that routes the request from the controller layer to the data access layer.

12. The system of claim 11, wherein the view builder layer further formats the data received from the data access layer according to the data services configuration file and provides the formatted data to the controller layer.

* * * * *